United States Patent [19]

Ferdinand et al.

[11] 4,362,196

[45] Dec. 7, 1982

[54] POWER TOOL TABLE WITH SAFETY SHUT-OFF

[75] Inventors: Irwin J. Ferdinand, Glencoe; Richard Sylvan, Glenview; Herbert Baisch, Palatine, all of Ill.

[73] Assignee: Hirsh Company, Skokie, Ill.

[21] Appl. No.: 190,442

[22] Filed: Sep. 24, 1980

[51] Int. Cl.³ .......................... D06F 71/00; B25H 1/00
[52] U.S. Cl. ............................ 144/286 R; 83/DIG. 1; 83/571; 192/133; 408/710; 409/134
[58] Field of Search ............... 144/286 R; 83/DIG. 1, 83/523, 571, 574; 408/710; 409/134; 192/124 R, 129 A, 133

[56] References Cited

U.S. PATENT DOCUMENTS 3,986,281 10/1976 Darwin ............................. 192/133

Primary Examiner—W. D. Bray
Attorney, Agent, or Firm—Dressler, Goldsmith, Shore, Sutker & Milnamow, Ltd.

[57] ABSTRACT

A table for supporting an electric power tool is provided with a safety shut-off device. A bar is pivotably mounted on the side of the table and a shut-off switch is mounted to the table behind the bar. The bar is biased away from the shut-off switch by a spring. If an operator falls or leans against the bar, the switch is actuated to shut off the power to the tool.

9 Claims, 5 Drawing Figures

POWER TOOL TABLE WITH SAFETY SHUT-OFF

DESCRIPTION

1. Technical Field

This invention relates to a table for supporting power tools and workpieces.

2. Background of the Invention

Various types of tables are available for supporting a power tool and a workpiece on a work table. Such tables usually have at least one side or end along which the operator stands while operating the tool.

Typically, such tables hold the power tool and workpiece at a convenient height. Usually the operator must reach over the table to actuate the tool on-off switch for starting and stopping the tool. Some tables may have an electric supply receptacle into which the cord of the power tool may be plugged and the receptacle may have a separate switch permitting the operator to turn the power tool on or off from the receptacle location. Though such tables may function satisfactorily in many situations, there are situations in which such table arrangements may not be entirely satisfactory.

For example, if an operator is using both hands to hold the workpiece on the table, it would be desirable to provide a means by which the power tool could be turned off without requiring the operator to remove his hands from the workpiece. Further, it would be desirable if the power tool would automatically shut off in those situations where an operator might accidentally lean or fall against the table.

SUMMARY OF THE INVENTION

In a preferred embodiment of the present invention a table is provided for supporting a power tool. The table is adapted to hold the tool in place, permit proper positioning of a workpiece relative to the tool, and provide a convenient work surface for the operator. One end or side of the table defines an operator location or position where the tool operator will normally stand while using the tool.

In the preferred embodiment, an abutment rail is mounted on the side of the table that is adjacent the operator location. This bar is biased toward the operator location by leaf spring.

An electrical interlock switch is mounted on the table directly behind the rail. An electrical feed normally supplies power to the tool through the interlock switch. In the preferred embodiment, the interlock switch is responsive to the movement of the rail. When the rail is moved away from the operator location (as by the operator leaning against the rail), the rail engages the interlock switch and causes the interlock to interrupt the supply of power to the tool.

Preferably, the interlock switch includes a two position, or "on-off", switch that is actuated to the "off" position by the movement of the rail. Thus, to shut off the tool the operator need only push the rail away from the operator location and against the switch. The switch cannot be actuated by the rail back to the "on" position. This prevents accidental re-energization of the power tool once the interlock has been actuated.

This apparatus thus permits the operator to turn off the power tool without removing his hands from the workpiece. To shut off the power, the operator need only lean against the rail. Should a handicapped tool operator not have full use of both arms or hands, this apparatus provides a quick and easy way for him to shut off the tool. In addition, should an operator accidentally fall against the table, the interlock switch is automatically actuated and cuts off the power to the tool.

Numerous other advantages and features of the present invention will become readily apparent from the following detailed description of the invention and of embodiments thereof, from the claims and from the drawings.

BRIEF DESCRIPTION OF THE DRAWINGS

In the accompanying drawings forming part of the specification and in which like numerals are employed to designate like parts throughout the same.

DESCRIPTION OF THE PREFERRED EMBODIMENT

Figure 1:
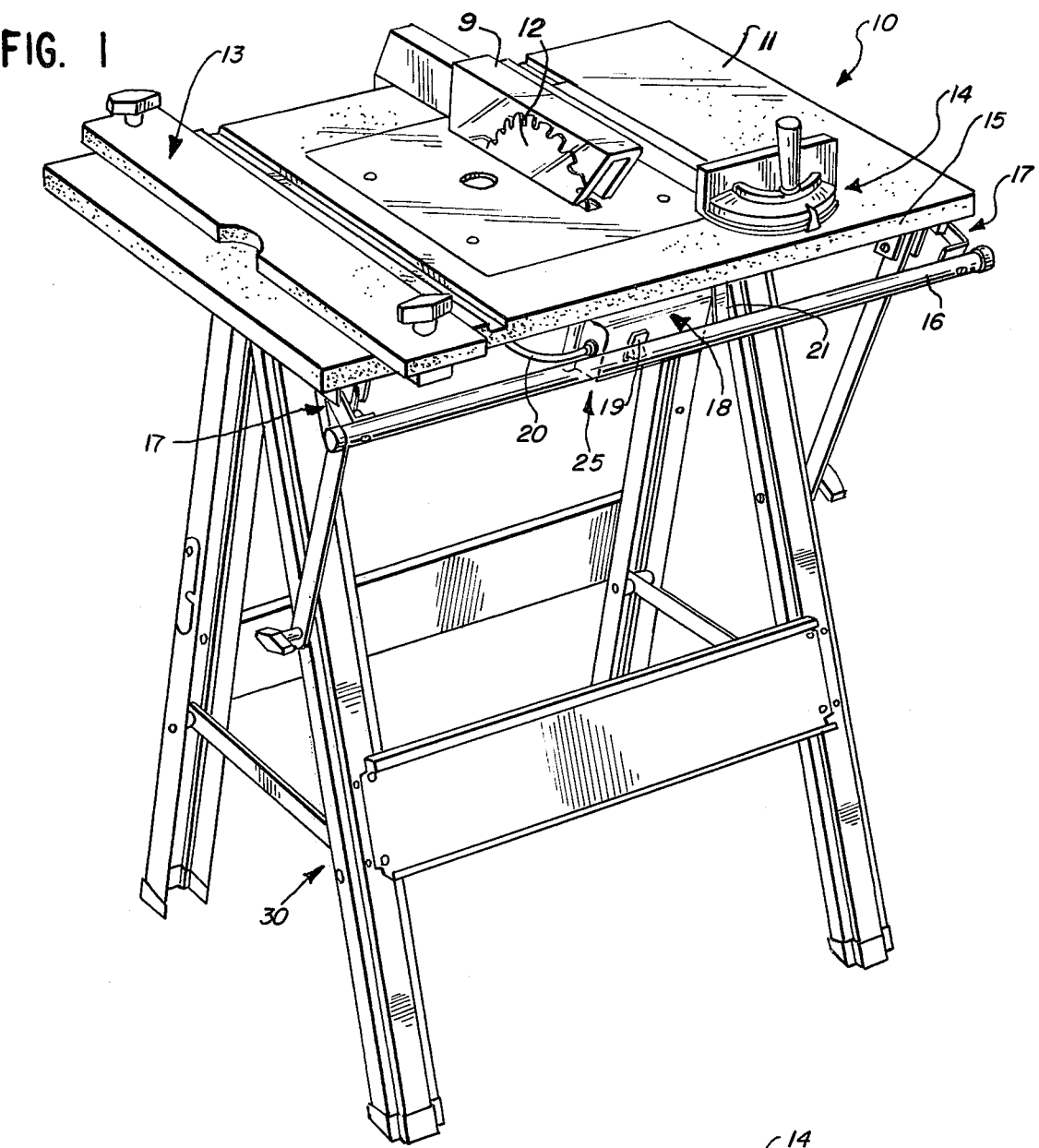
FIG. 1 is a perspective view of the table assembly of the present invention with a portable circular power saw mounted thereon.

While this invention is susceptible of embodiment in many different forms, there are shown in the drawings and will herein be described in detail a preferred embodiment of the invention. It should be understood, however, that the present disclosure is to be considered as an exemplification of the principles of the invention and is not intended to limit the invention to the embodiment illustrated.

The precise shapes and sizes of the components herein described are not essential to the invention unless otherwise indicated.

For ease of description, the apparatus of this invention will be described in a normal operating position, in terms such as upper, lower, horizontal, etc. will be used with reference to its normal operating position. It will be understood, however, that the apparatus of this invention may be manufactured, stored, transported, used and sold in an orientation other than the normal operating position described.

FIG. 1 illustrates the novel table assembly 10 which includes a table top 11 for supporting a power tool, such as a circular power saw 12. The table top 11 carries a workpiece guide or fence 13, which may be clamped to the table top 11 at a desired position, and also carries a slidable miter guide 14.

Table assembly 10 is supported by a suitable supporting means or frame 30. Frame 30 is of the conventional type that preferably is adapted to allow table assembly 10 to be folded for easy storage.

Figure 2:
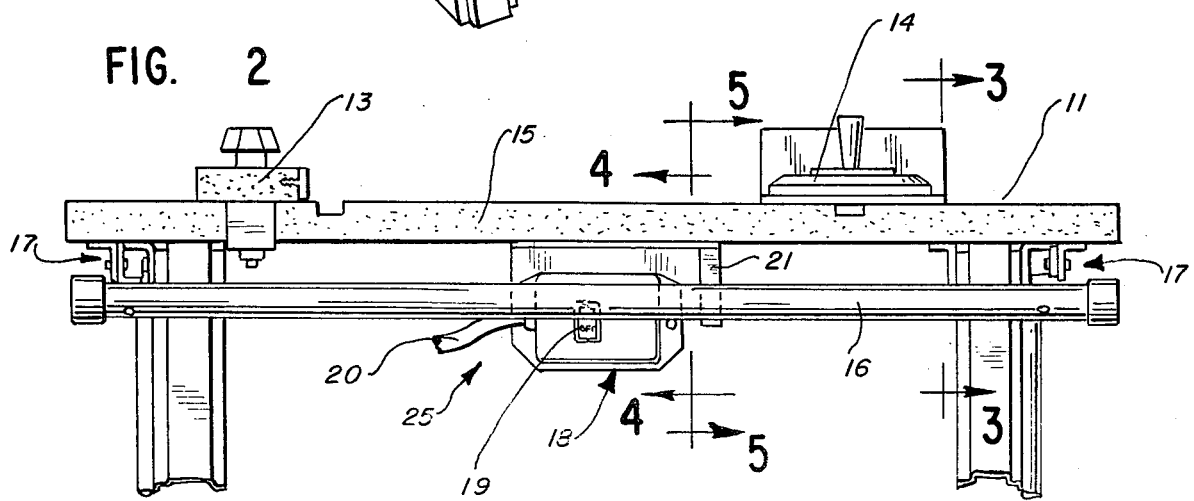
FIG. 2 is an enlarged, fragmentary, front view of the table assembly of FIG. 1, but with the power saw removed for clarity.

Table assembly 10 has a side, end, or one edge 15 which defines the operator location. The operator would generally stand along the side edge 15 while operating tool 12. Along the side 15, which defines the operator location, a power shut-off means or device 25 is provided, as best illustrated in FIGS. 1 and 2. The device 25 includes, in combination, a rail 16 mounted for pivoting movement on the underside of table top 11 and an interlock means 18, such as a safety disconnect switch or shut-off switch, mounted to the underside of table top 11 and which is normally electrically connected between an electric power feed means, such as a conductor or cord 20, and the tool 12.

The interlock means 18 includes an actuating means or member, such as switch button 19. Typically the supply cord 20 is plugged into a conventional electrical outlet and the power cord (not illustrated) of the power tool 12 is plugged into the interlock means 18. Normally, the interlock means 18 is "on" or set in a state to complete the electrical path between the cord 20 and the power tool cord.

Figure 3:
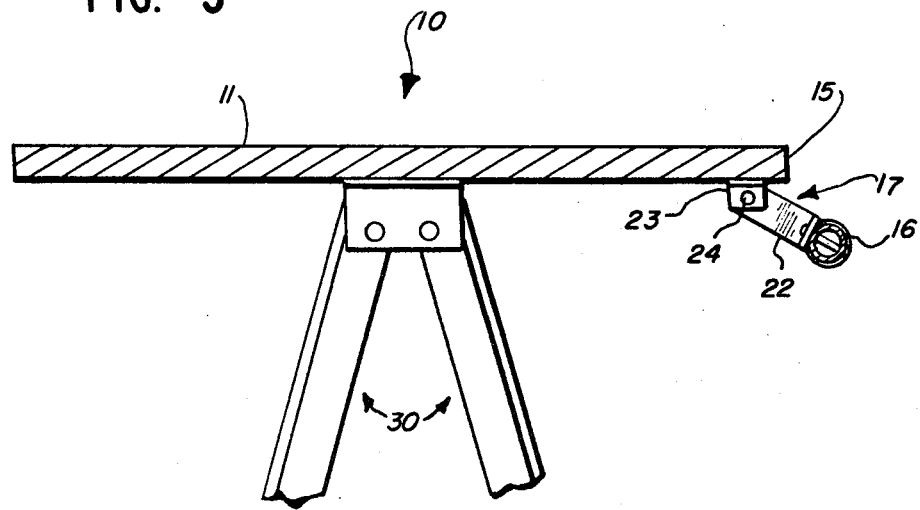
FIG. 3 is a fragmentary, cross-sectional view taken generally along the plane 3—3 of FIG. 2 (the table top conventional support brace having been deleted to simplify the drawing)
Figure 4:
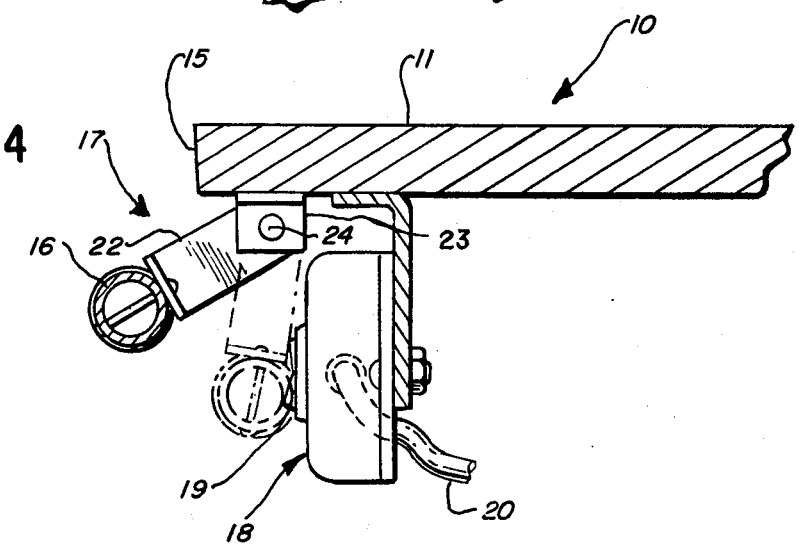
FIG. 4 is an enlarged, fragmentary, cross-sectional view taken generally along the plane 4—4 of FIG. 2 illustrating in detail the interlock mechanism and showing the rail at the moved position is dashed lines (the table top conventional support brace and fence having been deleted to simplify the drawing)

FIG. 3 best illustrates the means 17 for mounting the rail 16 to the underside of table top 11 along the side or one edge 15 which defines the operator location. Adjacent side 15 are a pair of spaced-apart mounting brackets 23 which are attached to the underside of table 11. An arm 22 is fixed to each end of rail 16 and is pivotably mounted to one of brackets 23 by a pin 24. In this way, mounting means 17 permits swinging movement of rail 16 between the position shown in solid lines and the position shown in dashed lines.

Figure 5:
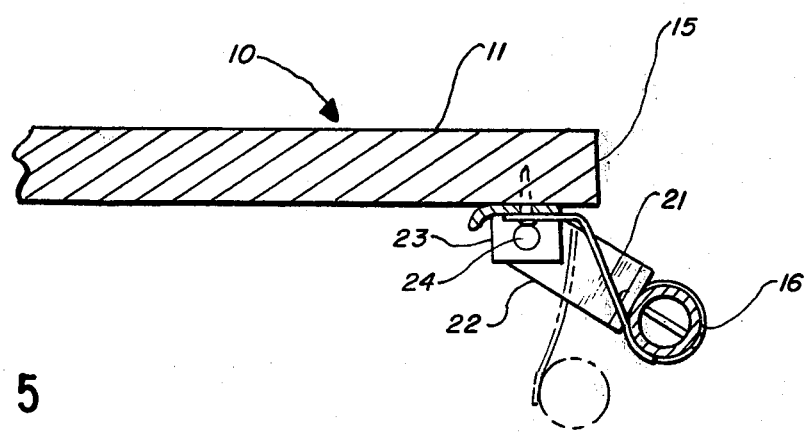
FIG. 5 is an enlarged, fragmentary, cross-sectional view taken generally along the plane 5—5 of FIG. 2 and showing the rail at the moved position in dashed lines (the table top conventional support brace and slidable miter guide having been deleted to simplify the drawing).

Preferably, a biasing means, such as leaf spring 21, is provided to bias the rail 16 outwardly away from the interlock means 18 and toward the operator location. As illustrated in FIG. 5, the leaf spring 21 is secured to the underside of the table top 11 and normally biases rail 16 into a first position adjacent the operator location.

In operation, movement of rail 16 away from a first position at the operator location and toward the table to a second position will cause the rail to engage switch button 19, thereby actuating interlock means 18 and interrupting the power to tool 12. Since leaf spring 21 biases rail 16 away from switch button 19 and towards the operator location, movement of the operator purposefully or accidentally against rail 16 is required in order to actuate interlock means 18 with the rail so as to turn off the tool.

From the foregoing, it will be observed that numerous variations and modifications may be effected without departing from the true spirit and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. An improvement in a table assembly for supporting a power tool in which said assembly includes a table defining, along one or more of its sides, an operator location or locations in which the operator stands while operating the tool, the improvement comprising:
   (a) an abutment rail disposed adjacent at least one of said operator locations;
   (b) means for mounting said abutment rail on said table which allow the rail to be moved towards and away from said operator location;
   (c) an electrical feed for supplying power to said tool; and
   (d) a two position switch electrically connected between said tool and said feed, said switch including a switch actuating button adapted for being moved by said rail to a self-maintained position in which said switch interrupts the supply of power to said tool for preventing re-energization of said tool even after said rail is moved back toward said operator location.

2. The improvement in accordance with claim 1 in which said abutment rail is a cylindrical bar.

3. The improvement in accordance with claim 2 in which said mounting means includes means for pivotably securing each end of said bar to said table for allowing swinging movement of the bar between a first position adjacent said operator location and a second position away from the operator location.

4. The improvement in accordance with claim 1 further including means for biasing said rail toward said operator location.

5. The improvement in accordance with claim 4 in which said biasing means is a leaf spring.

6. The improvement in accordance with claim 1 in which said switch actuating button is a protruding button adapted to be engaged by said rail to actuate said switch when the rail is moved away from said operator location.

7. An improvement in a table assembly for supporting an electrically operated power tool in which said assembly includes a table defining, along one or more of its sides, an operator location or locations in which the operator stands while operating the tool, the improvement comprising:
   (a) an electric power feed means carried by said table for supplying power from an external source of electric power to said assembly;
   (b) a switch carried by said table and adapted to be electrically connected between the said power feed means and said power tool for permitting the transmission of electric power to said power tool for operating said power tool when the switch is in a first position and for interrupting the supply of electric power to said power tool when the switch is in a second position; and
   (c) an abutment rail mounted to said table adjacent at least one of said operator locations and adapted to be moved (1) toward said one operator location to permit said switch to be actuated to said first position by said operator for energizing said power tool and (2) away from said one operator location by movement of the operator against the rail to actuate said switch to said second position and thereby shut off the power to said tool.

8. The improvement in accordance with claim 7, in which said switch includes a protruding button for being engaged by said rail.

9. An improvement in a table assembly for supporting a power tool in which said assembly includes a table defining an operator location along one edge, the improvement comprising:
   (a) an electric conductor supported by said table and adapted to transmit electricity from an electric power source;
   (b) a shut-off switch connected to said conductor and mounted to the underside of said table adjacent to said one edge;
   (c) an electric outlet receptacle connected in series with said shut-off switch and adapted to connect the shut-off switch to said tool;

(d) a pair of spaced-apart mounting brackets on the underside of said table adjacent said one edge;
(e) an arm pivotably mounted to each of said mounting brackets;
(f) a cylindrical bar adjacent and generally parallel to said one edge of said table and secured at each end to one of said arms whereby the bar can be moved between a first position adjacent said operator location and a second position engaging said shut off switch; and
(g) a leaf spring secured to and extending from the underside of said table along said one edge for biasing said bar toward first said position.

* * * * *